United States Patent
Luo

(10) Patent No.: US 10,167,991 B1
(45) Date of Patent: Jan. 1, 2019

(54) LOCKABLE DISPLAY SUPPORT

(71) Applicant: Shanghai ThinkWise Industrial Co., Ltd, Shanghai (CN)

(72) Inventor: Chengyi Luo, Shanghai (CN)

(73) Assignee: Shanghai ThinkWise Industrial Co., Ltd, Shanghai (CN)

( * ) Notice: Subject to any disclaimer, the term of this patent is extended or adjusted under 35 U.S.C. 154(b) by 0 days.

(21) Appl. No.: 15/857,660

(22) Filed: Dec. 29, 2017

(30) Foreign Application Priority Data

Jun. 8, 2017 (CN) .................... 2017 2 0660806 U

(51) Int. Cl.
*F16M 11/00* (2006.01)
*F16M 11/12* (2006.01)
*F16M 13/02* (2006.01)

(52) U.S. Cl.
CPC .......... *F16M 11/121* (2013.01); *F16M 13/02* (2013.01); *F16M 2200/025* (2013.01)

(58) Field of Classification Search
CPC ............................ F16M 11/10; F16M 11/2092
See application file for complete search history.

(56) References Cited

U.S. PATENT DOCUMENTS

| 6,592,090 | B1 * | 7/2003 | Li ...................... F16M 11/2092 |
| | | | 248/284.1 |
| 6,711,972 | B1 * | 3/2004 | Joyner ................. B25H 1/0021 |
| | | | 81/57.24 |
| 7,325,777 | B2 * | 2/2008 | Thiessen .............. B25H 1/0021 |
| | | | 248/278.1 |
| 7,562,852 | B2 * | 7/2009 | Wang ................. A47B 21/0314 |
| | | | 108/140 |
| 2004/0084587 | A1 * | 5/2004 | Oddsen .................. F16M 11/10 |
| | | | 248/284.1 |

FOREIGN PATENT DOCUMENTS

CN      201513681 U      6/2010

* cited by examiner

*Primary Examiner* — Amy J. Sterling

(57) ABSTRACT

The application relates to a lockable display support, which comprises a base, a cantilever and a suspension assembly for positioning the display; the cantilever comprises an upper cover, a lower cover, an upper shaft seat and a lower shaft seat which are hinged into a four-link mechanism. Wherein, the cantilever further comprises a lockable pneumatic rod placed between the upper cover and the lower cover, and hinged between the diagonal shaft points of the four-link mechanism. In the application, the angle of the cantilever can be reliably locked by the lockable pneumatic rod when it is locked, which can support not only the display but also the keyboard, thus avoiding upper and lower bounces of the cantilever and providing a stable and comfortable input operation experience; it features a simple structure and a solid support. Especially, it can be wall-hung, providing the support for stand-up input operations.

3 Claims, 2 Drawing Sheets

LOCKABLE DISPLAY SUPPORT

CROSS REFERENCE TO RELATED APPLICATIONS

The present application claims the benefit of Chinese Utility Model Application No. 201720660806.2 filed on Jun. 8, 2017, the contents of which are hereby incorporated by reference.

FIELD OF THE INVENTION

This application relates to the field of liquid crystal display support, in particular to a lockable display support.

BACKGROUND OF THE INVENTION

With the popularization of flat panel displays, especially, the liquid crystal panels almost replace the traditional CRT displays by virtue of their characteristics of light weight and compact structure, and also spawn a lot of new use needs and applications. In order to meet different individual needs, the display height, tilt, rotation, etc. need to be adjusted, but the supporting bases provided by display manufacturers have relatively simple functions. Therefore, many professional manufacturers get into this area for intensive research and development. For example, the patent numbered CN201513681U is a typical case. The patent relates to a support assembly structure for LCD display, comprising a bottom support base, a support rod movably connected to the bottom support base, and a beam flexibly connected with the support rod. The front end of the beam is secured with the support surface by means of a linking structure, wherein the linking structure comprises an L-shaped piece, an adjusting screw, a fixing screw and a pressing piece. The support rod is a pneumatic rod with two ends having end shafts. The two shafts are reversely set and the support base is composed of the base and a straight rod connected to the base. The top of the straight rod is provided with a shaft sleeve, and one end shaft of the support rod is inserted in the shaft sleeve; the two ends of the beam are provided with two shaft sleeves and the other end shaft of the support rod is inserted in one shaft sleeve of the beam; the shaft sleeve is connected by means of a linking piece with two supports and can securely fix the LCD display on various desktops or walls through different assembly forms and multi-angle adjustments. The design of the pneumatic rod is not reasonable and shows a weak support. Therefore, the application focuses on the design of a lockable pneumatic rod to lock the angles of the parallel four-link cantilever.

SUMMARY OF THE INVENTION

The primary purpose of the application is to design a four-link cantilever with a lockable pneumatic rod arranged between diagonal shaft points thereof. The height of the display support is adjusted by changing the morphology of the four-link cantilever in the unlock state of the linearly controlled lockable pneumatic rod. The secondary purpose is to lock the cantilever by using the lockable structure of the lockable pneumatic rod in the locked state, and add a keyboard support to the suspension assembly to meet the requirement of input operations.

The technical scheme of the application is realized as follows: A lockable display support comprises a base which may be placed or locked on a fixture, a cantilever and a suspension assembly for positioning the display; the cantilever comprises an upper cover, a lower cover, an upper shaft seat and a lower shaft seat which are hinged into a four-link mechanism. Wherein, the cantilever further comprises a lockable pneumatic rod placed between the upper cover and the lower cover, and hinged between the diagonal shaft points of the four-link mechanism, and a linear control end of the lockable pneumatic rod is arranged on the suspension assembly.

One end of the lockable pneumatic rod is hinged on the upper hinge point of the upper shaft seat, and the lower end of the lockable pneumatic rod is hinged on the lower hinge point of the lower shaft seat, which forms a lockable support.

The suspension assembly comprises an L-shaped arm, a connector, a keyboard support and an upper positioning shaft; the upper positioning shaft is locked at the bending of the L-shaped arm and is downwardly movably inserted in the upper shaft seat; the connector is positioned on the upper end of the L-shaped arm by a shaft for hanging the display; the keyboard support is positioned at the lower end of the L-shaped arm by a shaft; and the linear control end of the lockable pneumatic rod is disposed on the keyboard support.

The connector and the keyboard support are positioned respectively on the L-shaped arm by a shaft. Specifically, the L-shaped arm is provided with fixed shaft lugs, and the connector and the keyboard support are provided respectively with a movable shaft lug, one fixed shaft lag and one movable shaft lag are positioned by a shaft together; the arcuate outer edge of the fixed shaft lug is provided with an arc-shaped slot, a side of the moveable shaft lug is provided with a limit rod that is constrained in the arc-shaped slot.

In the application, the height of the display support can be flexibly adjusted by changing the morphology of the four-link cantilever when the lockable pneumatic rod is unlocked. The angle of the cantilever is reliably locked by the lockable pneumatic rod when it is locked, which can stably support not only the display but also the keyboard for input operations. It can avoid upper and lower bounces of the cantilever due to continuous downward force formed in input operations, thus providing a stable and comfortable input operation experience; it features a simple structure and a solid support. Especially, it can be wall-hung, providing the support for stand-up input operations.

BRIEF DESCRIPTION OF THE DRAWINGS

The application is described in details in combination with the drawings as follows.

Wherein,

1—Base; 2—Cantilever; 21—Upper cover; 22—Lower cover; 23—Upper shaft base; 24—Lower shaft base; 25—Lockable pneumatic rod; 26—Linear control end; 3—Suspension assembly; 31—L-shaped arm; 311—Fixed shaft lug; 312—Arc-shaped slot; 32—Connector; 321—Movable shaft lug; 322—Limit rod; 33—Keyboard support; 34—Upper positioning shaft; 35—Shaft; 4—Display.

DETAILED DESCRIPTION

Figure 1:
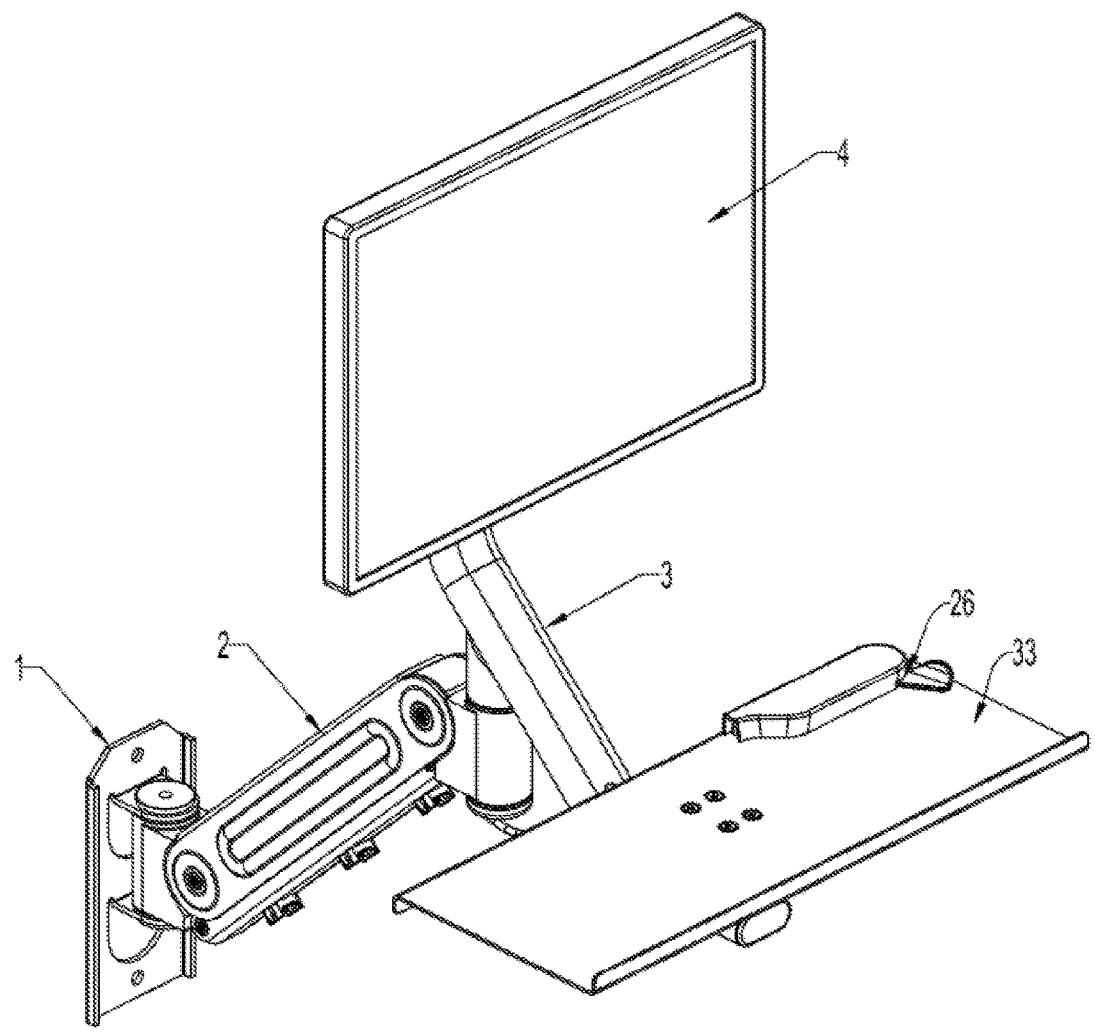
FIG. 1 is the schematic diagram of the lockable display support in use state.
Figure 2:
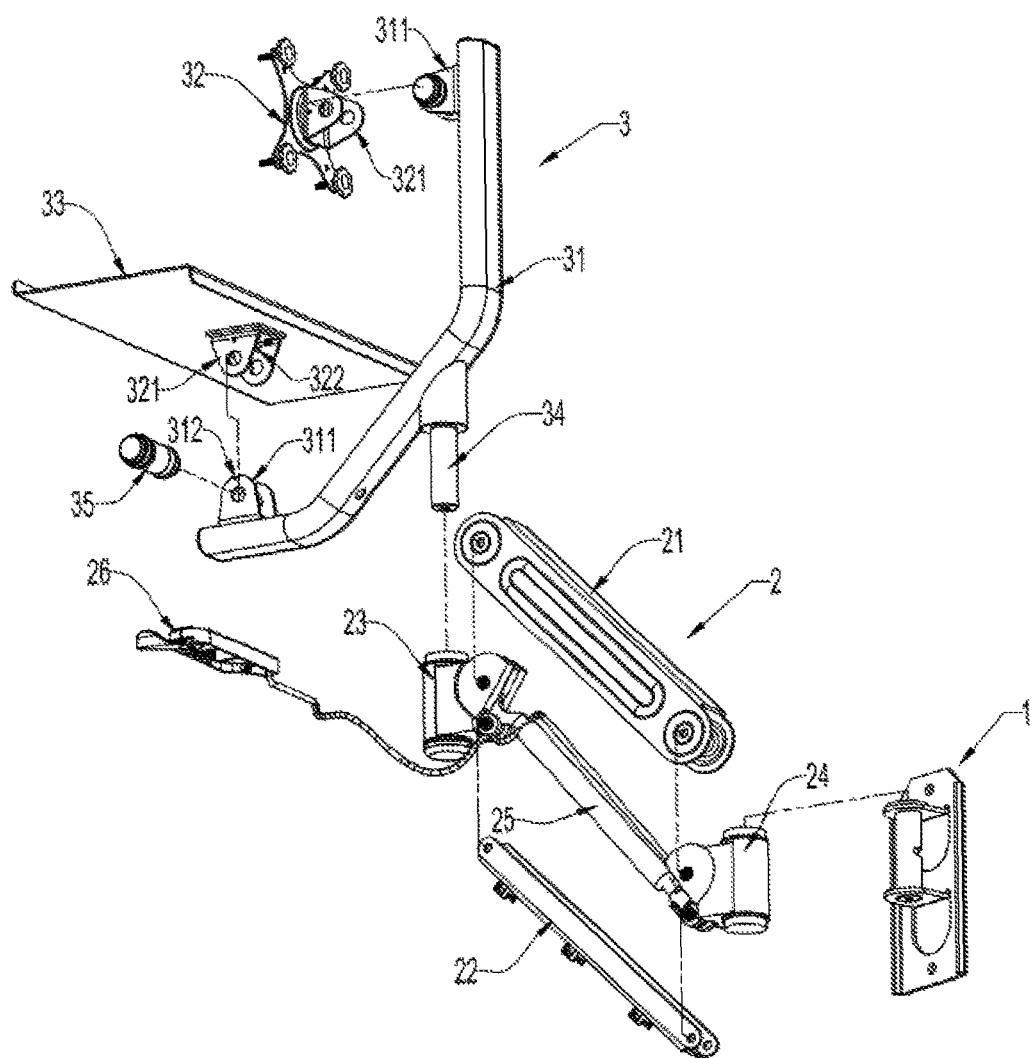
FIG. 2 is the decomposition diagram of the lockable display support.

Referring to FIG. 1 and FIG. 2, a lockable display support comprises three parts, i.e. a base 1, a cantilever 2 and a suspension assembly 3; in the illustrated example, the base 1 is a wall-hung structure which can be directly locked on a wall; it also can be a stand support or floor support column which can be locked on the desktop or the ground.

The cantilever 2 comprises an upper cover 21, a lower cover 22, an upper shaft seat 23, a lower shaft seat 24 and a lockable pneumatic rod 25. The upper cover 21, the lower cover 22, the upper shaft seat 23 and the lower shaft seat 24 are hinged into a four-link mechanism. Specifically, the lockable pneumatic rod 25 is hinged on the diagonal shaft points of the four-link mechanism. More specifically, one end of the lockable pneumatic rod 25 is hinged on the upper hinge point of the upper shaft seat 23, the lower end is hinged on the lower hinge point of the lower shaft seat 24, which forms a locking support when the lockable pneumatic rod 25 is locked, that is, the distance between the two diagonal hinge points is locked, so that the four-link mechanism can be reliably locked at a specific angle; a linear control end 26 for controlling the lockable pneumatic rod 25 is arranged on the suspension assembly.

The suspension assembly 3 comprises an L-shaped arm 31, a connector 32, a keyboard support 33 and an upper positioning shaft 34; the upper positioning shaft 34 is locked at the bending of the L-shaped arm 31 and is downwardly movably inserted in the upper shaft seat 23 and can freely rotate about the upper shaft seat; the connector 32 is positioned at the upper end of the L-shaped arm 31 by a shaft for hanging the display 4; the keyboard support 33 is positioned at the lower end of the L-shaped arm 31 by a shaft for holding the keyboard and mouse, and providing a space for input operations; the linear control end 26 of the lockable pneumatic rod is arranged on the keyboard support 33, so as to facilitate manipulation and adjustment.

The connector 32 and the keyboard support 33 are positioned on the L-shaped arm 31. The L-shaped arm 31 is provided with two fixed shaft lugs 311, and the connector 32 and the keyboard support 33 are provided with a movable shaft lug 321 respectively, one fixed shaft lugs 311 and one movable shaft lag 321 are positioned by a shaft 35 together; the arcuate outer edge of the fixed shaft lug 311 is provided with an arc-shaped slot 312, a side of the movable shaft lug 321 is provided with a limit rod 322 that is constrained in the arc-shaped slot 312. That is, it only moves in the arc-shaped slot 312, limiting the pitch adjustment range of the display 4 and the keyboard support 33.

What is claimed is:

1. A lockable display support, comprising a base, a cantilever and a suspension assembly for positioning the display; wherein the base is placed or locked on a fixture; the cantilever comprises an upper cover, a lower cover, an upper shaft seat and a lower shaft seat which are hinged into a four-link mechanism; wherein, the cantilever further comprises a lockable pneumatic rod placed between the upper cover and the lower cover, and hinged between diagonal shaft points of the four-link mechanism, and a linear control end of the lockable pneumatic rod is arranged on the suspension assembly;

wherein the suspension assembly comprises an L-shaped arm, a connector, a keyboard support and an upper positioning shaft the upper positioning shaft is locked at the bending of the L-shaped arm and is downwardly movably inserted in the upper shaft seat the connector is positioned on the upper end of the L-shaped arm for hanging the display by a shaft the keyboard support is positioned at the lower end of the L-shaped arm by a shaft; and the linear control end of the lockable pneumatic rod is disposed on the keyboard support.

2. The lockable display support according to claim 1, wherein one end of the lockable pneumatic rod is hinged on the upper hinge point of the upper shaft seat, and the lower end of the lockable pneumatic rod is hinged on the lower hinge point of the lower shaft seat, which forms a lockable support.

3. The lockable display support according to claim 1, wherein the connector and the keyboard support are positioned respectively on the L-shaped arm by a shaft; the L-shaped arm is provided with fixed shaft lugs, and the connector and the keyboard support are provided respectively with a movable shaft lug, one fixed shaft lug and one movable shaft lug are positioned by a shaft together; the arcuate outer edge of the fixed shaft lug is provided with an arc-shaped slot, a side of the movable shaft lug is provided with a limit rod that is constrained in the arc-shaped slot.

* * * * *